United States Patent [19]

Framberg

[11] Patent Number: 5,222,715
[45] Date of Patent: Jun. 29, 1993

[54] VALVE CONSTRUCTION

[75] Inventor: Norman S. Framberg, Glenview, Ill.

[73] Assignee: Mead Fluid Dynamics, Inc., Chicago, Ill.

[21] Appl. No.: 891,858

[22] Filed: Jun. 1, 1992

[51] Int. Cl.⁵ .............................................. F16K 11/00
[52] U.S. Cl. .............................. 251/267; 137/596.16; 137/596.15; 285/323
[58] Field of Search ...................... 137/596.15, 596.16, 137/884; 251/267; 285/322, 323, 373

[56] References Cited

U.S. PATENT DOCUMENTS

| | | | |
|---|---|---|---|
| 3,092,141 | 6/1963 | Stark | 251/367 X |
| 3,554,229 | 1/1971 | Coyle | 137/884 |
| 3,899,200 | 8/1975 | Gamble | 285/373 X |
| 4,178,023 | 12/1979 | Guest | 285/323 |
| 4,456,026 | 6/1984 | Kantor | 251/367 X |
| 4,519,421 | 5/1985 | Stoll | 137/596.16 |

FOREIGN PATENT DOCUMENTS 0033303 9/1981 European Pat. Off. .

Primary Examiner—John C. Fox
Attorney, Agent, or Firm—Andrus, Sceales, Starke & Sawall

[57] ABSTRACT

A valve construction comprising a molded body including a plurality of body sections each having a generally flat inner surface. The flat surfaces of the body sections are disposed in contiguous relation along an interface. Each surface has a plurality of recesses that mate with complementary recesses in the surface of the other body section to form compartments in the assembled body, and operating components, such as valves, are located in the compartments. The movable elements of the operating components move in a direction parallel to the plane of the interface. Each surface also has a plurality of channel portions mating with complementary channel portions in the other surface to form channels that interconnect the compartments. Each surface also includes a plurality of port sections which mate with port sections in the other surface to form ports which establish communication between the channels and the exterior of the body.

27 Claims, 2 Drawing Sheets

VALVE CONSTRUCTION

BACKGROUND OF THE INVENTION

It is the universal aim of valve designers to improve operating performance, reduce size relative to flow capacity, and to lower production costs.

In the past, valve bodies have been formed by extensive machining of solid material and more recently valve bodies have been die cast from metal or injection molded from plastic materials. Die casting has distinct advantages over machined valve bodies because of free holes and extra shaping which can be obtained. Even more sophisticated valve body configurations are possible through plastic molding.

However, die cast and molded valve bodies, as currently designed and produced, generally require substantial machining, port thread inserts, retaining caps, gaskets, and assembly screws. To form internal channels that intersect, expensive drilling and plugging operations are necessary. Further, grooves and large internal galleries are not normally formed in the molding process, because core pin removal would be impossible. Therefore, extra parts are required to form galleries and grooves which consume space and add to the overall cost of the valve.

Many valves include push-in fittings, in which the flow tubes can be inserted and removed from the valve body without the use of a tool. The normal push-in fitting consists of a threaded body, a collet to attach the body to the tube and an O-ring seal. The body of the fitting represents the major share of the cost and size of the fitting.

Exhaust silencing is also used with many pneumatic valves and this is accomplished by turning conically shaped sintered metal elements into the valve exhaust port. In most situations the valve silencing element is required to be installed by the valve user, which adds to the overall cost of the valve.

SUMMARY OF THE INVENTION

The invention is directed to an improved valve construction in which the body of the valve is formed in two or more layers or sections which are joined at interfaces that lie in planes parallel to the direction of operation of the operating components of the valve.

More particularly, each body section has a generally flat inner surface that is disposed in flatwise contiguous relation to the inner surface of a second body section along an interface. Each surface is provided with a plurality of recesses that mate with and complement recesses in the surface of the other body section to form compartments that receive operating components, such as valve units, solenoids, and the like. Each operating component includes a movable element that is movable in a direction parallel to the plane of the interface.

In addition, the inner surface of each body section is also formed with a plurality of channel portions that mate with and complement channel portions in the inner surface of the other body section to form channels that interconnect the compartments.

Also formed in the inner surface of each body section are a plurality of port sections which mate with port sections in the inner surface of the other body section to form ports. The ports establish communication between the channels and the exterior of the valve body.

The two body sections are preferably formed by molding of plastic material and the contiguous surfaces of the two body sections can be connected together by various means including ultrasonic welding or adhesives.

With the invention, the two body sections are virtually mirror images of each other and the flow channels and recesses for internal components are formed partially, but not necessarily equally, in each body section.

To assemble the valve, the internal parts are dropped into the compartment recesses of one of the valve body sections and the second body section is then placed over the first section, with the components or internal parts seating within the recesses in the second body section. The two layers are then joined together to provide the completed valve body.

With this construction, all of the internal components are automatically trapped in place and all channels are formed and sealed. There is no need for additional machining, port inserts, retaining caps, or assembly screws, as is necessary in conventional valve constructions. In addition, all electrical components, such as solenoids, are encapsulated in the body and are shielded from the outside environment.

The construction of the invention provides increased power density, i.e. flow capacity relative to size, because the flow channels, although narrow, can be deep, sinuous and aerodynamically shaped. This shaping reduces turbulence by eliminating sharp corners and abrupt changes in the flow direction that normally impede the movement of fluids in a conventional valve construction.

The valve construction of the invention is more compact than conventional types and the compactness results from the ability to optimize the position of each internal component without regard to the usual limitations associated with tool access or core pin pulls.

Assembly of the layered body sections is considerably simpler than assembly of traditionally designed valves, because the entire operating area is laid open prior to sealing. The internal components may be easily placed into position in the open side of one of the body sections rather than being pushed into internal grooves and blind holes as in a conventional valve design. Further, because the closure of the body sections traps and locates all internal parts, space is not consumed by the presence of retaining caps and fasteners.

As a feature of the invention, the body portion of the push-in fitting is formed integrally with the valve body. With the invention, the collet and O-ring are mounted in the specially designed ports of the body, with the valve body itself serving to support the collet. This eliminates the need for a push-in fitting body, which is required with conventional valve constructions.

As a further feature of the invention, valve exhaust silencing can be incorporated in the exhaust or outlet port of the valve. With this construction, a block or plate of sintered metal silencing material can be entrapped in recesses in the valve body sections during assembly, so that the valve silencing is incorporated directly with the valve body and it is not necessary to attach auxiliary silencing components to the body, as in conventional constructions.

The valve construction of the invention significantly improves power density, compactness, cost effectiveness, and general utility of the valve. The invention allows the entire operating section to be formed with all required passages, grooves and galleries, by simply bringing the two body sections together in mating relation.

Other objects and advantages will appear in the course of the following description

DESCRIPTION OF THE DRAWINGS

The drawings illustrate the best mode presently contemplated of carrying out the invention.

In the drawings.

DESCRIPTION OF THE ILLUSTRATED EMBODIMENT

The drawings illustrate a valve construction, such as a pneumatic valve construction, which includes a body 1 formed of a pair of body sections 2a and 2b. Body sections 2a and 2b are molded from either a plastic material or metal, and each body section includes a generally flat inner surface 3. The surfaces 3 are positioned in contiguous flatwise relation along an interface and are bonded together by some means such as ultrasonic welding or an adhesive.

Figure 2:
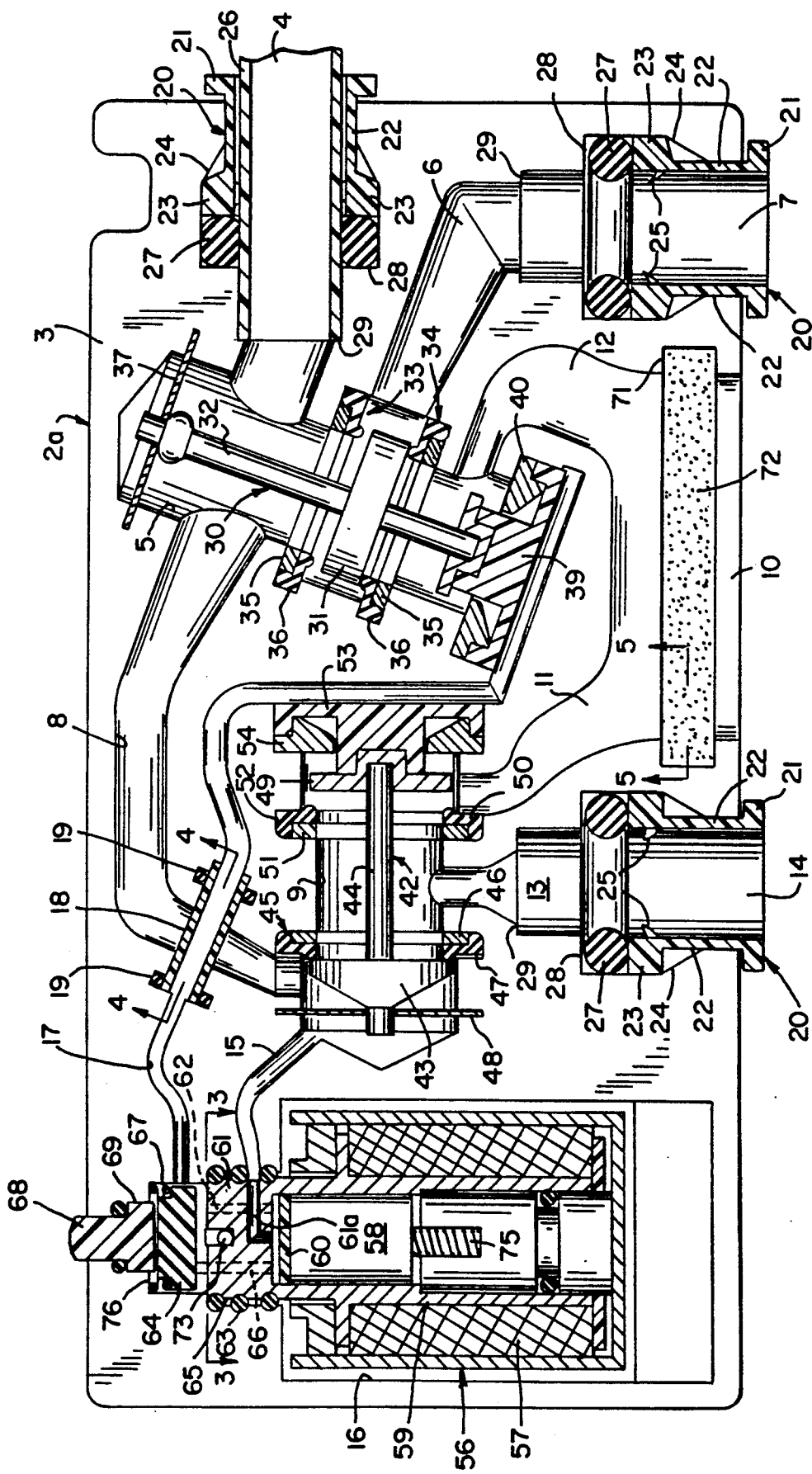
FIG. 2 is a section taken along line 2—2 of FIG. 1 and showing the inner surface of one of the body sections with the internal components placed therein.

FIG. 2 shows the invention as applied to a single solenoid piloted pneumatic valve, but the invention is not limited to this particular valve construction and is adapted to be used with a wide variety of valve constructions.

FIG. 2 is a section taken along the interface between surfaces 3 of body sections 2a and 2b. As illustrated in FIG. 2, valve body 1 includes an inlet port 4 which is connected to a source of air or other fluid and the inner end of port 4 communicates with a valve chamber or compartment 5. Channel or passage 6 connects the valve compartment 5 with a port 7, which can be connected, for example, to one end of a fluid cylinder. A passage 8 connects valve compartment 5 with a second valve chamber or compartment 9.

The body 1 is also provided with an outlet or exhaust port 10 and channels or passages 11 and 12 connect the exhaust port with the valve compartments 9 and 5, respectively. In addition, a passage 13 is connected between valve compartment 9 and port 14, which can be connected to the opposite end of the fluid cylinder.

Figure 1:
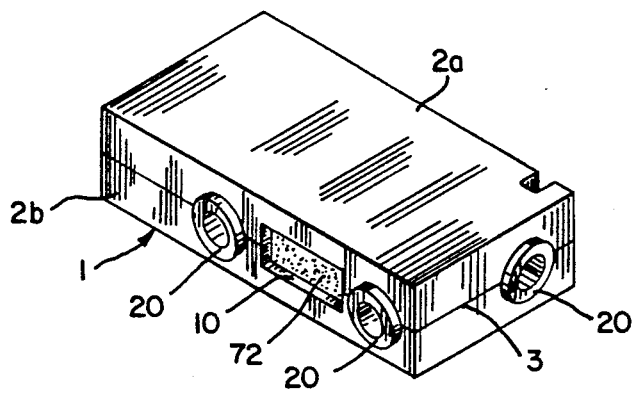
FIG. 1 is a perspective view of a valve constructed in accordance with the invention.
Figure 3:
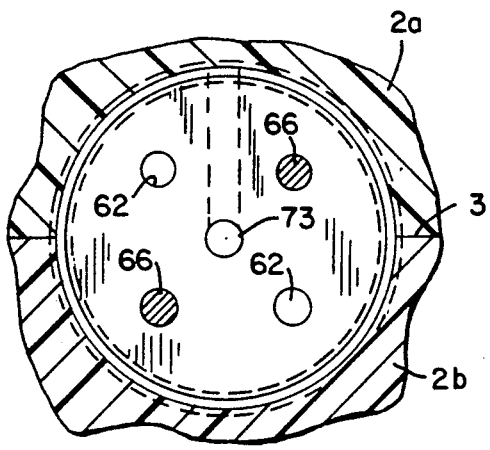
FIG. 3 is a section taken along line 3—3 of FIG. 2.
Figure 4:
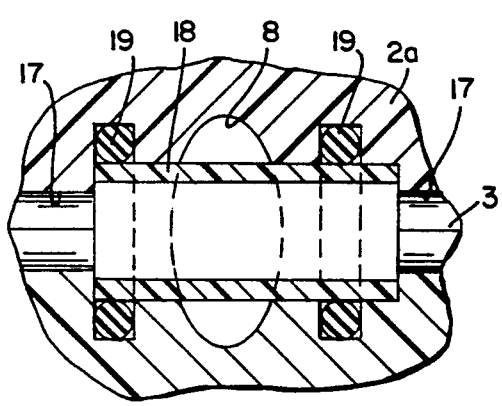
FIG. 4 is a section taken along line 4—4 of FIG. 2.
Figure 5:
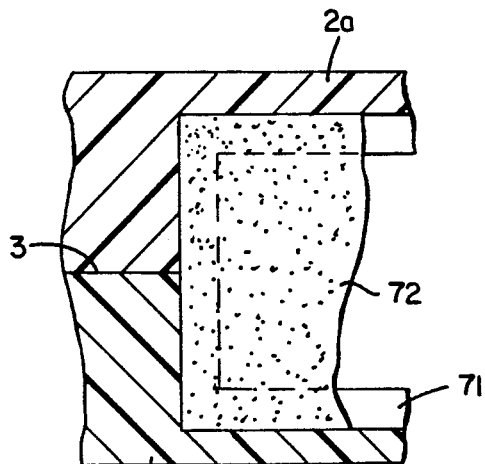
FIG. 5 is a section taken along line 5—5 of FIG. 2.

Also included in valve body 1 is a passage 15 which interconnects the valve passage 8 and a chamber or compartment 65 which communicates with the larger diameter solenoid chamber 16. Passage 17 connects the end of the compartment 65 with the ends of the valve compartments 9 and 5. To permit passage 17 to pass across the passage 8, a tube 18 having a lesser cross sectional area than passage 8 intersects the passage 8. As shown in FIG. 4, the ends of tube 18 bear against shoulders in valve body 1 to prevent displacement of the tube, and O-ring seals 19 are positioned in mating grooves in body sections 2a and 2b to seal the tube to the valve body.

The interface between the body sections 2a and 2b intersects the ports 4, 7 and 14, as well as the valve compartments 5 and 9 and the solenoid compartment 16. In addition, the interface between the body sections also intersects the flow passages or channels 6,8,11,12,13,15 and 17 which interconnect the compartments and the ports. Thus, the flow channels and the compartments for internal components are formed partially, but not necessary equally, in each body section 2a and 2b.

Figure 6:
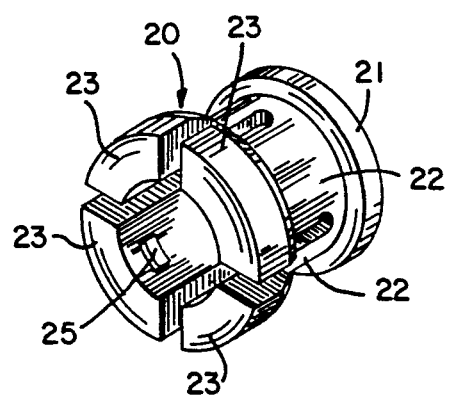
FIG. 6 is a perspective view of the collet of a push-in fitting.

Ports 4, 7 and 14 are similar in construction and incorporate push-in connectors. In this regard a collet or sleeve 20 is located within each port and the outer end of the collet is provided with an outwardly extending flange 21, which is located on the exterior of the valve body 1. As best shown in FIG. 6, the collet is provided with four equally spaced, flexible longitudinal legs 22, and each leg terminates in an enlarged head or tab 23 which is engaged with an annular shoulder 24 formed in body sections 2a and 2b of the valve body. The inner surface of each leg 22 can be formed with one or more barbs or teeth 25 which are adapted to engage the outer surface of a flow tube 26 to hold the tube within the port. The tube 26 is sealed within the port by an O-ring 27 which is located between the heads 23 of legs 22 and the internal shoulder 28 of the body. Insertion of tube 26 is limited by engagement of the end of the tube with the annular ledge 29 of the port.

With this construction, the valve body 1 itself forms the outer support for the collet 20 of the push-in connector and this eliminates the need for an outer fitting body which is required in conventional push-in type fittings. The fitting body is normally the most expensive part of the conventional push-in fitting. Not only does the invention eliminate the fitting body, but as the collet 20 is located within the valve body 1, as opposed to being mounted on the exterior of the valve body, a more compact unit is achieved.

A poppet valve unit 30 is mounted within the valve compartment 5. Valve unit 30 includes a valve disc 31 carried by a stem 32. Valve disc 31 can be moved between a pair of valve seats 33 and 34, each of Which is mounted in mating grooves in body sections 2a and 2b.

Each valve seat 33,34 includes a metal backing ring 35 and a resilient facing ring or seal 36. The outer periphery of seal 36 is sealed against the valve body, while the outer face of each seal 36 is adapted to engage the respective face of the valve disc 31.

To center the valve stem 32 in compartment 5, the end of the stem 32 carries a spring 37, the peripheral edge of which is mounted within mating slits in the valve body sections 2a and 2b. The face of spring 37 is provided with a helical groove and will accommodate movement of the valve stem 32, while maintaining proper alignment of the valve stem and valve disc 31 within the compartments.

Mounted on the opposite end of valve stem 32 is a flexible resilient diaphragm 39 formed of rubber-like material and the peripheral edge of the diaphragm is mounted within mating grooves in body sections 2a and 2b through a rigid washer or ring 40.

During operation, valve stem 32 will move axially and this direction of movement is parallel to the interface between the two body sections 2a and 2b.

A valve unit 42 is mounted within the valve compartment 9, and valve unit 42 includes a valve disc 43 which is carried by stem 44, and is adapted to engage a valve seat 45 that is located in an annular groove in valve body 1 defined by mating groove portions in body sections 2a and 2b. Valve seat 45 is similar in construction to seats 33 and 34, and includes a rigid backing ring 46 and a resilient outer facing ring 47 which is adapted to engage and seal to valve disc 43.

Valve disc 43 is centered within the compartment 9 by a spring 48, similar in construction to spring 37, which is connected to valve disc 43 and the peripheral edge of the spring is seated within a slit formed in valve body sections 2a and 2b.

In addition to valve disc 43, a second valve disc 49 is carried by stem 44 and valve disc 49 is adapted to seat to engage valve seat 50, which is mounted within a groove in the valve body. The groove is defined by mating groove portions in body sections 2a and 2b. As in the case of valve seats 33 and 34, valve seat 50 includes a rigid backing ring 51 and an outer resilient sealing ring 52, which is adapted to be engaged by the valve disc 49.

The stem 44 along with valve disc 43 and 49 are connected to a flexible resilient diaphragm 53, which is mounted through mounting ring 54 within a groove in the valve body sections 2a and 2b.

With this construction, the outer surface of diaphragm 53, as well as the outer surface of diaphragm 39 are exposed to the pressure of the fluid in passage 17.

Valve unit 42 is adapted to move along the axis of stem 44 and this direction of movement is parallel to the interface between body sections 2a and 2b.

As a feature of the invention, a solenoid 56 is mounted within the solenoid compartment 16 and is encapsulated within the body 1. Solenoid 56 includes an annular coil 57 and a movable plunger 58 which is separated from the coil by a generally cylindrical housing 59. The outer end of plunger 58 carries a resilient seat 60, which will seat against the raised surface on head 61 of housing 59 under the influence of the plunger spring 75. Head 61 is provided with a laterally extending passage 61a which establishes communication between passage 15 and the plunger chamber of the solenoid. Head 61 is also formed with a pair of parallel bores 62 which connect passage 15 with chamber 65, via passage 61a and the plunger chamber, when solenoid coil 65 is energized. The outer periphery of head 61 is sealed to body 1 by O-ring seals 63.

A resilient disc 64 is mounted for movement within the upper section of chamber 65, and a pair of pins 66 extend through openings in head 61 and the outer ends of the pins project beyond the head 61 and engage the inner surface of the disc 64. A coil spring 67 is interposed between the outer surface of disc 64 and an internal shoulder or ledge 76 in chamber 65. A button 68 is mounted for axial movement within a chamber 69 that communicates with the upper section of chamber 65. Button 68 provides a manual override for the solenoid. By depressing button 68, disc 64 will correspondingly be moved inward and this movement will operate through pins 66 to lift the solenoid plunger 58.

As a further feature of the invention, exhaust silencing is incorporated in body 1. In this regard, body sections 2a and 2b, adjacent exhaust outlet 10, are provided with mating groove portions that define a groove or recess 71 which receives the peripheral edge of a plate or block 72 of silencing material, which can take the form of sintered bronze. With this construction the silencer 72 is entrapped between the body sections 2a and 2b during assembly of the valve body 1.

In operation of the valve, as associated with a fluid cylinder, air or other fluid under pressure is introduced into the inlet port 4 and in this mode of operation, the valve units 30 and 42 are in the position shown in FIG. 2. The air flows from port 4 into valve compartment 5 and then past valve seat 33 to passage 6 and from there the air flows through port 7 to one end of the cylinder. Concurrently, air is exhausted from the opposite end of the cylinder through port 14 where it flows through passage 13 to valve compartment 9. As valve disc 49 is open at this time, the air will be discharged through passage 11 to exhaust outlet 10.

When the solenoid 56 is energized, plunger 58 will be electro-magnetically raised, thus unseating the resilient disc 60 and connecting passage 15 through passage 61a to the solenoid chamber and holes 66 to the upper section of chamber 65. As the peripheral edge of the disc 64 is spaced from the wall of the chamber 65, the air will then flow around the disc 64 and to passage 17. The pressure of the air in passage 17 will then operate against both diaphragms 39 and 53 causing valve disc 31 to close on valve seat 33 and opening valve disc 43 while simultaneously closing valve 49. With valve disc 43 open, the pressurized air will flow from passage 8 through open valve disc 43, through port 14 to the fluid cylinder and air from the opposite end of the cylinder will be directed inwardly through port 7, through passage 6 past the open valve seat 34 into passage 12 and then through exhaust outlet 10.

When solenoid 56 is deenergized, the air pressure in channel 17 will be exhausted through a relief port 73 in head 61 and the valve units 30 and 42 will be returned to the position shown in FIG. 2.

As previously noted, the particular construction of the valves and channels, as illustrated in FIG. 2, is not critical and can take various forms. The construction shown in FIG. 2 is merely illustrative of a typical valve that can be produced in accordance with the invention.

In assembling the valve, one of the body sections 2a, 2b is placed with the surface 3 facing upwardly and the various internal components, such as valve units 30 and 42, solenoid 56, valve seats, push-in fittings, etc., are then dropped into the open-sided recesses and grooves in the body section. The second body section is then placed on top of the first body section containing the internal components, and the two body sections are sealed together along interface 3. As a result, the internal components are automatically trapped in place, and all of the channels or passages are formed and sealed. Thus, no additional machining, port inserts, retaining caps, or assembly screws are required. Further, all of the electrical components, such as the solenoid 56, are encapsulated within the body and are shielded from outside environment.

As previously noted, the body sections can be sealed together through ultrasonic welding, or by chemical bonding, or by mechanical means.

The valve of the invention, while compact in size, has substantially improved power density because the flow channels or passages, although narrow, may be designed with considerable depth and also can be aerodynamically shaped. This shaping reduces turbulence by eliminating sharp corners and abrupt changes in the flow direction that normally impede the movement of fluids. As seen in FIG. 4, the channels, such as 8, are preferably non-circular in cross section, with the long dimension of the cross section being normal to the interface between surfaces 3.

As all of the internal components are merely dropped into position in the recesses and grooves in the open surface of the body section, the assembly is substantially simplified over conventional valve constructions, which require components to be pushed into internal grooves and blind holes. Further, as the assembly of the body sections automatically traps and locates all internal parts, retaining caps and fasteners are not required.

With the silencing element being entrapped within the body, the design of the silencing element can be simplified. Moreover, the valve is more compact in that it eliminates the need for attaching auxiliary silencers to the outer surface of the valve.

The valve of the invention has substantially improved power density, compactness, and cost effectiveness, as compared to conventional valves. The invention allows the entire valve to be formed complete with all required internal components, passages, grooves and galleries, by simply placing the internal components in the open side of one body section and then bringing the two body sections together.

Various modes of carrying out the invention are contemplated as being within the scope of the following claims particularly pointing out and distinctly claiming the subject matter which is regarded as the invention.

We claim:

1. A valve construction, comprising a body including a plurality of body sections each having an inner surface, said inner surfaces being disposed in contiguous relation along an interface, each inner surface having at least one recess that mates and complements a recess in the surface of the other body section to form a compartment, an operating component disposed in said compartment and having a movable valve element mounted to move in a direction parallel to the plane of said interface, each surface having a plurality of channel portions each mating with complementary channel portions in the surface of the other body section to form flow channels disposed to conduct a fluid, said flow channels being connected to said compartment, each surface also having a plurality of port sections each mating with a contemplating port section in the surface of the other body section to form ports that established communication between said flow channels and the exterior of said valve body, at least one of said surfaces also having a pilot channel disposed to conduct a fluid, connecting means for connecting the body sections together, and pilot means operably connected to said valve element and responsive to pressure in said pilot channel for moving said valve element in said compartment and controlling the flow of fluid through said flow channels.

2. The valve construction of claim 1, and including a valve seat mounted in mating grooves in each body section, said movable valve element disposed to engage said seat.

3. The valve construction of claim 1, wherein a first of said ports comprises an inlet for the introduction of fluid to said body, a second of said ports comprises an outlet, and a third of said ports comprises an exhaust port.

4. The valve construction of claim 3, and including silencing means disposed within said body and extending across said exhaust port.

5. The valve construction of claim 4, wherein each surface is provided with a groove section adjacent said exhaust port to mate with and complement a groove section in the other surface to form a groove, said silencing means disposed within said groove.

6. The valve construction of claim 5, wherein said silencing means comprises a generally flat plate.

7. The valve construction of claim 6, wherein said silencing means is composed of sintered material.

8. The valve construction of claim 1, wherein at least one of said flow channels is non-circular in cross section and has a long dimension and a short dimension, said long dimension being disposed normal to the plane of said interface.

9. The valve construction of claim 1, wherein the axis of movement of said movable element lies along said interface.

10. The valve construction of claim 1, wherein said body sections are composed of plastic, said connecting means comprises an ultrasonic weld.

11. The valve construction of claim 1, wherein said body sections are composed of plastic and said connecting means comprises chemical bonding.

12. The valve construction of claim 1, wherein said connecting means comprises a mechanical connector.

13. A valve construction, comprising a body including a pair of body sections each having a generally flat inner surface, said inner surfaces disposed in contiguous relation along an interface, each surface having a plurality of spaced recesses that mate with and complement recesses in the surface of the other body section to form a plurality of spaced compartments, a valve unit disposed in each compartment and having a movable vale member movable in a direction parallel to the plane of said interface, each surface having a plurality of channel portions mating with and complementing channel portions in the surface of the other body section to form a plurality of channels, said channels interconnecting said compartments, each surface also having a plurality of port sections mating with and complementing port sections in the inner surface of the other body section to form ports, said ports establishing communication between said channels and the exterior of said body, at least one of said ports constituting an inlet for a fluid, a second of said ports constituting an outlet for said fluid and a third port to exhaust said fluid, means for connecting the contiguous surfaces together, a connector disposed in at least one of said ports, said connector comprising a flexible cylindrical section disposed in said port and an enlarged inner section, said body having an internal abutment bordering said port, the enlarged inner section of said connector engaged with said abutment to prevent axial displacement of said connector from said port, and a plurality of surface deviations disposed on the inner surface of said cylindrical section and disposed to engage a tube inserted within said port.

14. The valve construction of claim 13, wherein said cylindrical section comprises a plurality of longitudinally extending circumferentially spaced legs, said connector also including an outer section connected to corresponding outer ends of said legs and disposed outward of said valve body, said enlarged inner section comprising radially extending tabs connected to the inner ends of said legs.

15. The valve construction of claim 13, wherein the recesses in one of said surfaces are substantially equal in cross section size to the corresponding recesses in the other of said surfaces.

16. A valve construction, comprising a body including a plurality of body sections each having an inner surface, said inner surfaces being disposed in contiguous relation along an interface, each inner surface having at least one recess that mates and complements a recess in the surface of the other body section to form a compartment, a solenoid disposed in said compartment and having a movable plunger mounted to move in a direction parallel to the plane of said interface, each surface having a plurality of channel portions each mating with complementary channel portions in the surface of the other body section to form fluid channels, said channels being connected to said compartment, each surface also having a plurality of port sections each mating with a complementary port section in the surface of the other body section to form ports that establish communication between said channels and the exterior of said valve body, and connecting means for connecting the body sections together.

17. The valve construction of claim 16, wherein said body sections encapsulate said solenoid and said plunger.

18. The valve construction of claim 16, said plunger being movable in a direction parallel to the plane of said interface.

19. A valve construction, comprising a body, including a plurality of body sections each having an inner surface, said inner surfaces being disposed in contiguous relation along an interface, each inner surface having at least one recess that mates and complements a recess in the surface of the other body section to form a compartment, an operating component disposed in said compartment and having a movable element mounted to move in a direction parallel to the plane of said interface, each surface having a plurality of channel portions each mating with complementary channel portions in the surface of the other body section to form channels, said channels being connected to said compartment, each surface also having a plurality of port sections each mating with a complementary port section in the surface of the other body section to form ports that establish communication between said channels and the exterior of said valve body, connecting means for connecting the body sections together, a connector disposed in each port, each connector having a generally cylindrical flexible section disposed in said port and an enlarged inner end, an annular internal abutment disposed in said body and bordering said port, said inner end engaged with said abutment, and a plurality of barbs on the inner surface of said cylindrical section and disposed to engage a tube inserted in said port.

20. The valve construction of claim 19, wherein said cylindrical section comprises a plurality of circularly spaced flexible legs, said legs being flexible in a radial direction, said enlarged end being disposed on the end of each leg.

21. The valve construction of claim 19, and including annular sealing means disposed in said port and located axially inward of said connector for sealing said body to a tube inserted in said port.

22. A valve construction, comprising a body including a pair of body sections each having a generally flat inner surface, said inner surfaces disposed in contiguous relation along an interface, each surface having a plurality of spaced recesses that mate with and complement recesses in the surface of the other body section to form a plurality of spaced compartments, a valve unit disposed in each compartment and having a movable vale member movable in a direction parallel to the plane of said interface, each surface having a plurality of channel portions mating with and complementing channel portions in the surface of the other body section to form a plurality of channels, said channels interconnecting said compartments, each surface also having a plurality of port sections mating with and complementing port sections in the inner surface of the other body section to form ports, said ports establishing communication between said channels and the exterior of said body, at least one of said ports constituting an inlet for a fluid, a second of said ports constituting an outlet for said fluid and a third port to exhaust said fluid, a silencing member disposed within said valve body and extending across said exhaust port, said silencing member comprising a press of sintered material, and means for connecting the contiguous surfaces together.

23. The valve construction of claim 22, wherein each surface has a seat portion mating with a complementary seat portion in the surface of the other body section to form a valve seat bordering said compartment, said valve element being movable in a direction toward and away from said valve seat.

24. The valve construction of claim 22, wherein each surface is provided with a groove section adjacent said outlet that mates and complements a groove section in the inner surface of said other body section, said groove sections in combination defining a groove to receive the periphery of said mass of sintered material.

25. A valve construction, comprising a body including a plurality of body sections each having an inner surface, said inner surfaces being disposed in contiguous relation along an interface, each inner surface having a plurality of channel portions each mating with complementary channel portions in the surface of the other body section to form a main fluid channel and a pilot channel, means for introducing an operating fluid into said channels, valve means mounted for movement in said main channel for controlling the flow of fluid through said main channel, and pressure responsive pilot means communicating with said pilot channel and operably connected to said valve means and responsive to a predetermined pressure of said fluid in said pilot channel for moving said valve means in said main fluid channel to thereby control the flow of fluid in said main channel.

26. The valve construction of claim 25, wherein said pressure responsive pilot means comprises a diaphragm exposed to said pilot channel and connected to said valve means.

27. The valve construction of claim 25, and including second valve means disposed in said pilot channel to control the flow of fluid therein, said second valve means being operable through external stimuli to control the flow of fluid in said pilot channel.

* * * * *

UNITED STATES PATENT AND TRADEMARK OFFICE
CERTIFICATE OF CORRECTION

PATENT NO. : 5,222,715
DATED : June 29, 1993
INVENTOR(S) : NORMAN S. FRAMBERG

It is certified that error appears in the above-indentified patent and that said Letters Patent is hereby corrected as shown below:

Col. 8, Line 26, CLAIM 13, Cancel "vale" and substitute therefor ---valve---; Col. 10, Line 2, CLAIM 22, Cancel "vale" and substitute therefor --valve--; Col. 10, Line 18, CLAIM 22, Cancel "press" and insert --mass--

Signed and Sealed this

Thirteenth Day of September, 1994

Attest:

BRUCE LEHMAN

*Attesting Officer*  *Commissioner of Patents and Trademarks*